May 6, 1952 — J. SWISS ET AL — 2,595,728
POLYSILOXANES CONTAINING ALLYL RADICALS
Filed March 9, 1945
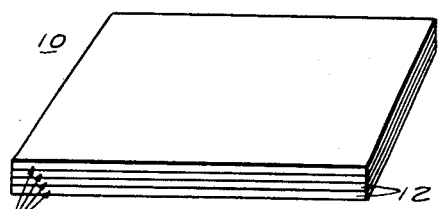
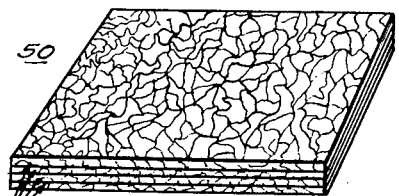
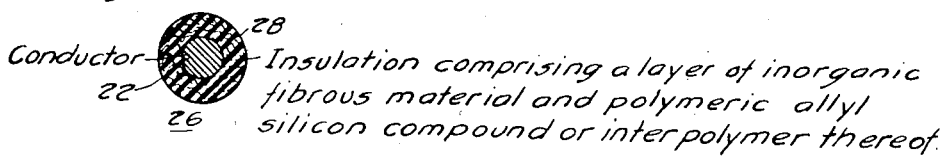
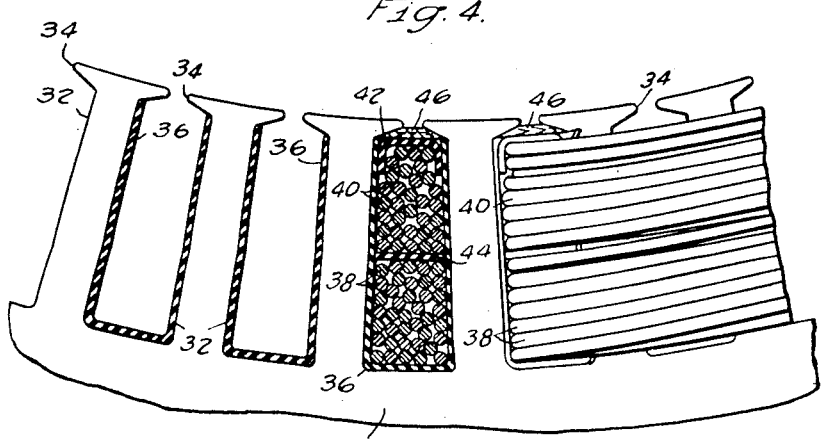

Patented May 6, 1952

2,595,728

UNITED STATES PATENT OFFICE 2,595,728

POLYSILOXANES CONTAINING ALLYL RADICALS

Jack Swiss, McKeesport, and Clyde E. Arntzen, Pittsburgh, Pa., assignors to Westinghouse Electric Corporation, East Pittsburgh, Pa., a corporation of Pennsylvania Application March 9, 1945, Serial No. 581,837

4 Claims. (Cl. 260—46.5)

This invention relates to organosilicon compounds, their preparation and use. More particularly, this invention is concerned with new and useful substances comprising organic compounds of silicon having unsaturated organic groups attached to the silicon atom.

It is well known in the art that certain saturated organosilicon compounds may be prepared by attaching saturated organic groups to silicon atoms. A number of silicon compounds have been prepared by replacing one or more of the ethoxyl radicals in ethyl silicate, for example, with various alkyl or aryl groups. Saturated organosilicon compounds thus prepared with one, two or three saturated organic radicals attached to the silicon atom can be hydrolyzed to form the corresponding organosilicols which, in turn, dehydrate spontaneously or can be dehydrated to form polymeric organosilicon oxides or siloxanes. The silicon oxide polymers are characterized by silicon-oxygen bonds. The silicon-oxygen bond is capable of withstanding much higher temperatures than conventional organic bonds such as carbon-to-carbon or carbon-to-oxygen and the like as found in most organic compounds. Consequently, the siloxanes are excellent for use in applications subjected to elevated temperatures at which resins composed of ordinary hydrocarbon compounds and their common derivatives cannot be employed.

It is also known that the siloxanes containing saturated organic groups may be prepared and polymerized to form polymers having almost any desired degree of hardness or elasticity. The most useful siliconoxide polymers for most commercial uses, however, are those having good flexibility. Experience with the flexible saturated organic siliconoxide polymers shows that they have excellent thermal properties but they lack resistance to hydrocarbon solvents, oils and other hydrocarbon chemicals. For example, a flexible sheet of a silicon oxide polymer such as methyl siloxane when immersed in toluene will swell in a short time and when removed from the toluene will be found to crumble readily when manipulated. This shortcoming greatly limits the possible applications of the saturated organosilicon oxide polymers.

A further drawback in connection with the saturated organosilicon oxide polymers is encountered in preparing solid polymers from low silicon oxide polymers. The low silicon oxide polymers, which are usually fluids, require excessive times and temperatures to convert them into higher solid polymers. In nearly all cases, the conversion to a solid polymer requires more than 6 hours at 250° C.—often as much as 50 hours at 250° C. are necessary for this purpose. This is not only time consuming, but is costly as well.

The object of this invention is to provide for producing allylsilicon compounds.

A further object of the invention is to provide for producing polymeric bodies embodying allylsilicon compounds, particularly allyl siloxanes.

Another object of this invention is to provide for producing polymeric bodies composed of interpolymers of allylsilicon compounds and saturated organosilicon compounds characterized by rapid polymerization and a high resistance to hydrocarbon solvent compounds.

Other objects of the invention will in part be obvious and will in part appear hereinafter.

For a fuller understanding of the nature and objects of this invention, reference should be had to the following detailed description and drawing, wherein:

Figure 1 is a view in perspective of a laminated member impregnated with a polymerized allylsilicon compound;

Figs. 2 and 3 are greatly enlarged views in cross section of conductors carrying an insulating coating of polymerized allylsilicon compound;

Fig. 4 is a fragmentary view partly in section of a cross section of a dynamoelectric stator; and Fig. 5 is a view in perspective view of a laminated sheet of mica flakes.

This application is a continuation-in-part of our copending patent application Serial No. 514,372, filed December 15, 1943, now abandoned, entitled "Organo-Silicon Compounds and Products Thereof."

The allylsilicon compounds of this invention and our copending patent applications may be represented generally by the following formula

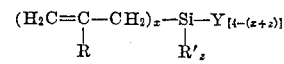

where R represents hydrogen or a methyl radical; $x$ is a number from 1 to 3; R' represents a hydrocarbon group such as methyl, phenyl or substituted phenyl radicals; $z$ is a number from 0 to 2 and Y represents ethoxyl, chlorine, hydroxyl, oxygen or other radicals.

In the present invention, allylsilicon compounds having the following unit structure have been produced:

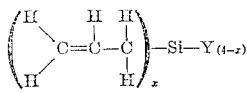

where Y represents chlorine, ethoxyl, or hydroxyl radicals, and X represents a number from 1 to 3. Furthermore, the allylsilicon compound may contain one or more saturated organic groups attached to the silicon atoms. By "saturated" organic group, we denote non-polymerizing organic groups such as alkyl, phenyl and alkylphenyl and the like.

Other allylsilicon compounds are more specifically disclosed in other of our copending patent applications. In our copending patent application, Serial No. 581,839 filed March 9, 1945, and entitled "Organo-Silicon Compounds and Products Thereof" we have disclosed allylphenylsilicon compounds including both the phenyl and substituted phenyl radicals. In our copending patent application Serial No. 581,838, filed March 9, 1945, entitled "Organo-Silicon Compounds and Products Thereof," we have disclosed allylmethylsilicon compounds such, for example, as allyldimethylsilicon ethoxide and allyltrimethylsilicon. In our parent case above referred to, we have described the preparation of allylmethylsilicon diethoxide and the preparation of various derivatives thereof. Also, in our copending patent application Serial No. 581,836, filed March 9, 1945, entitled "Organo-Silicon Compounds and Products Thereof," we have disclosed the preparation of methallylsilicon compounds and various products thereof.

In the general preparation of allylsilicon compounds, it is convenient to start with either ethyl silicate or silicon tetrachloride and to treat either of these with a Grignard reagent to substitute the desired allyl, or methallyl and, if required, one or more saturated organic groups for the ethoxyl or chlorine groups attached to silicon. The following illustrative examples are given in order that those skilled in the art may better understand how the present invention may be carried out.

*Example 1*

To a solution of 8.75 moles of ethyl silicate dissolved in 730 cc. of ethyl ether, a very dilute solution of allylmagnesium chloride dissolved in ethyl ether was added over a period of 42 hours. The allylmagnesium chloride was prepared by introducing allyl chloride slowly into a mass of magnesium shavings in ethyl ether. Approximately seven moles of allylmagnesium chloride so prepared was added to the ethyl silicate.

By means of distillation, allylsilicon ethoxide compounds were separated from the salts formed in the primary reaction. Fractional distillation was applied to the distillate in order to separate the several allyl compounds. Relatively pure allylsilicon triethoxide and diallylsilicon diethoxide, as confirmed by subsequent chemical analysis, were recovered from the fractional distillation. For diallylsilicon diethoxide, which is believed to be novel, the boiling point was 189.5° C. (corr.) at 741 mm. The index of refraction was $n_D^{25}$ 1.4316 and the density $d^{25}$ 0.8787. The properties of the allylsilicon triethoxide were as follows: B. P. 175.8° C. (corr.) at 740 mm. The index of refraction was $n_D^{25}$ 1.4063. The density was $d^{25}$ 0.9032.

By varying the ratio of the moles of ethyl silicate to the moles of allylmagnesium chloride, the ratio of the output moles of allylsilicon triethoxide to diallylsilicon diethoxide can be varied. The reaction is believed to proceed according to the following equation:

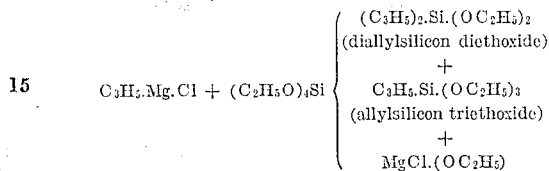

In the above example, allylmagnesium bromide can be used in lieu of allylmagnesium chloride.

*Example 2*

A mixture of 10 gram moles of allylchloride and 10 gram moles of ethyl silicate was added to a vessel containing 12 gram atoms of magnesium. The liquid was separated from the magnesium salt by distillation under reduced pressure. Fractional redistillation under reduced pressure enabled the separation of the individual allylsilicon triethoxide, diallylsilicon diethoxide and triallylsilicon ethoxide. The triallylsilicon ethoxide was again fractionally distilled to further purify it. The triallylsilicon ethoxide is believed to be a novel compound. Its boiling point was 127°–129° C. (corr.) at 84 mm. The index of refraction and density were respectively: $n_D^{25}$ 1.4569 and $d^{25}$ 0.8543. The calculated weights of the component of the triallylsilicon ethoxide were: C, 67.29; H, 10.27; Si, 14.29. Analyses of two samples give the following closely corresponding values: C, 67.63 and 67.89; H, 10.29 and 10.39; and Si, 14.08 and 14.00.

In the above examples silicon tetrachloride could have been used as the initial base and treated with the Grignard reagent to produce the corresponding allylsilicon chlorides.

The allylsilicon ethoxides and allylsilcon chlorides can be polymerized directly to form resinous bodies. The polymerization is believed to take place through the unsaturated group in the allyl radical. For example, when allylsilicon triethoxide containing 3% benzoyl peroxide is heated on a flat surface at 70° C., it polymerizes into a hard transparent film in a short period of time. Suitable catalysts for promoting the polymerization are well known and comprise organic and inorganic peroxides, inorganic acids, inorganic halides and the like. Similarly, diallylsilicon diethoxide and allylmethylsilicon diethoxide may be polymerized under the same conditions in the presence of a catalyst. In addition, mixtures of two or more of the allylsilicon ethoxide compounds described in this application or in our copending patent applications referred to herein can be treated with a small portion of a polymerizing catalyst and converted to hard transparent films by heating for a period of time.

Allylsilicon triethoxide was also polymerized with allyl phthalate in the presence of benzoyl peroxide as a polymerizing catalyst to produce a hard and transparent film after 16 hours at 70° C. Similarly, a composition of allyl carbonate with an equal weight of allylsilicon triethoxide produced a hard transparent polymer when treated with a peroxide polymerizing catalyst and heated for a period of time.

All of the allylsilicon ethoxide polymers, including those with allyl phthalate and carbonate additions, were not appreciably affected by hydrocarbon solvents.

Products which are potentially more useful than the ethoxide polymers may be prepared by hydrolyzing the allylsilicon ethoxides to form the respective silicols and the silicols can then be dehydrated, thereby forming allyl siloxanes. The following equations are believed to represent the successive hydrolysis and dehydration reactions using diallylsilicon diethoxide as an example:

$(C_3H_5)_2Si(OC_2H_5)_2 + 2H_2O \rightarrow (C_3H_5)_2Si(OH)_2 + 2(C_2H_5OH)$ (diallyl silicol)

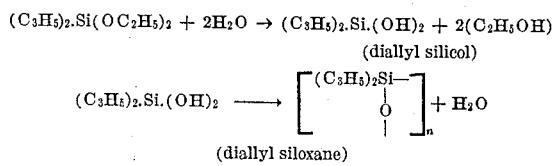

(diallyl siloxane)

It is not necessary to isolate any particular allylsilicon compound, since mixtures having a predetermined combination of any two or all three of the allylsilicon compounds may be hydrolyzed and then dehydrated. The following formula will represent the allylsilicon compounds generally in all the various stages of processing:

$(C_3H_5)_xSi \cdot Y_{(4-x)}$ where $x$ is from 1 to 3 and Y is an ethoxyl, hydroxyl, chlorine, or the like.

In some cases the silicols may be polymerized through the allyl groups in much the same manner as the polymerization of the allylsilicon ethoxides was accomplished.

During the dehydration of the allylsilicols, a molecule of water is eliminated between two hydroxyl groups and condensation takes place to form polymers having alternate silicon-oxygen bonds. The dehydration is preferably carried out in the presence of a dehydrating agent, particularly materials capable of absorbing or chemically combining with water. Boric acid esters, such for example as methyl borate, metal halides, the oxides and halides of phosphorus, sulphuric acid and hydrochloric acid have been found to be suitable dehydrating agents. Heating is advised in order to expedite the dehydration.

The nature of the products produced by the condensation reaction with the formation of silicon-oxygen bonds is greatly determined by the kind and proportion of hydrolyzable groups present in the silicon compound being converted to the silicone. Thus when hydrolyzed and then dehydrated, the triethoxides form three dimensional polymers while the diethoxides form linear polymers while the monoethoxides can form only a single silicon-oxygen linkage and therefore tend to terminate a polymer chain. Consequently, a mixture containing a high proportion of the monoethoxide will tend to produce relatively small siloxane polymer units. On the other hand, a large proportion of the triethoxide will tend to the formation of solid low thermoplastic, cross-linked polymers. However, for most purposes a flexible polymer with a moderate amount of cross-linkage is preferred. This last type of polymer is characterized by a large proportion of the double silicon-oxygen bond molecules. In most cases, the polymers are mixtures of two or three different siloxanes.

In general, the dehydration of the allylsilicols is carried out initially only to the extent that a low viscosity fluid of an oily nature which is solvent soluble is produced. As condensation is prolonged, particularly with heating, thick gummy masses or solids result.

The outstanding advantage of the allyl siloxanes of this invention is that the polymers have been found to overcome the shortcomings of saturated organosilicon oxides particularly the poor solvent resistance. Further, unexpected and highly desirable results are obtained when allyl siloxanes are combined with the saturated organic silicones. The solid polymeric products of the methyl siloxanes, ethyl siloxanes, phenyl ethyl siloxanes, and phenyl methyl siloxanes and similar saturated alkyl and aryl organosilicon compounds have been greatly improved in their physical and chemical properties by the addition of small amounts of the allyl siloxanes, particularly when combined so that interpolymers or copolymers are formed. Siloxane interpolymers containing from 0.1% to 10% by weight of allyl siloxane form flexible resinous bodies such as films, coatings, sheets and the like, characterized by extraordinary heat stability, resistance to hydrocarbon solvents, oils and water and resistance to deterioration from oxygen and other usually harmful atmospheric substances. In other cases, as much as 50% of the weight of the interpolymers may be composed of allyl siloxane with highly advantageous results. The allyl siloxanes enable cross-linking through the unsaturated group in the allyl radical whereby the molecules are linked by strong primary valence forces.

One component of the siloxane interpolymers may be a siloxane derived by hydrolyzing and then dehydrating a saturated organic silicon compound having the unit structure $R_xSiY_{(4-x)}$ where R is a saturated alkyl or aryl radical, $x$ is from 1 to 3 and Y is a halide, ethoxide or other hydrolyzable group. Since the silicon compounds are not always pure single compounds, but are usually mixtures, $x$ may be other than a whole number. For most purposes, a minimum of the compound where $x$ is 3 is desired. The interpolymers may be prepared by admixing the saturated organic siloxane with any or all of the allyl siloxanes herein disclosed. Other allylsilicon compounds such as are disclosed and described in our other copending patent applications hereinbefore mentioned may be admixed with the allylsilicon compounds of the instant invention. The admixing may be accomplished either with the siloxanes as liquids of a low degree of polymerization or solutions of either or both in a solvent. It is believed that better results are obtained, however, if the saturated organosilicon ethoxides are admixed with the allylsilicon ethoxides (or the corresponding silicon halides) and the hydrolysis and dehydration is carried out thereafter upon the mixture. The following are typical examples of the procedure:

*Example 3*

To a mixture of 60 cc. (0.3 mole) of methylsilicon triethoxide, 35 cc. (0.2 mole) of dimethylsilicon diethoxide and 19 cc. (0.1 mole) of allylsilicon triethoxide was added 35 cc. of xylene and 1 cc. of concentrated sulphuric acid. Subsequently, 21 cc. of water and 21 cc. of ethyl borate, as a dehydrating agent, were added dropwise alternately in 3 cc. portions with stirring. Toluene was added to the mixture and after thorough stirring the toluene layer was permitted to separate. The toluene layer was decanted and dried over calcium chloride. The toluene solution contained about 60% siloxane copolymer solids by weight. A portion of the toluene solution when brushed upon a metal surface and heated overnight at 120° C. produced a smooth tack-free film. The same methyl siloxanes alone would not have dried fully in several weeks at this temperature. The interpolymer film did not swell or soften when immersed in organic liquid such as toluene or a refined petroleum transformer oil.

*Example 4*

To a mixture of 70 cc. (0.4 mole) dimethylsilicon diethoxide and 42.5 cc. (0.2 mole) allylsilicon triethoxide, there was added 35 cc. of xylene and 1 cc. of 85% phosphoric acid. The mixture was cooled in an ice bath and 15 cc. (0.88 mole) of water was added dropwise with stirring. After 16 hours, 70 cc. of solvent was distilled out. The residue was treated by adding alternately dropwise in 10 cc. portions 20 cc. of water and 20 cc. of ethyl borate as a dehydrating agent. The product was then washed and dried. A viscous liquid resulted upon removal of the solvent. The following equations are believed to be typical of the reactions taking place:

$(CH_3)_2.Si(OC_2H_5)_2 + C_3H_5.Si.(OC_2H_5)_3 + H_2O \longrightarrow$ $(CH_3)_2.Si(OH)_2 + C_3H_5.Si(OH)_3 \longrightarrow$ (dimethyl silicol) (allyl silicol)

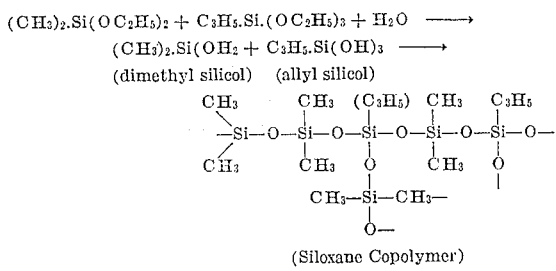

(Siloxane Copolymer)

The particular configuration of the siloxane copolymer shown in the above equation is just one of a great number of possible combinations. Furthermore, there may be some cross-linkage through the unsaturated allyl radical.

The viscous siloxane liquid of this example with the addition of 1% benzoyl peroxide or terbutyl perbenzoate or the like as a polymerizing catalyst was applied to a panel and baked overnight at 75° C. A tack-free transparent film insoluble in organic solvents resulted. The ratio of hydrocarbon radicals to silicon atoms was 1.67 to 1 in this example.

*Example 5*

A mixture of 0.9 mole of dimethylsilicon diethoxide and 0.1 mole of allylsilicon triethoxide when hydrolyzed and condensed into a silicone, as in Examples 3 and 4, yielded an oily liquid. After being heated to 315° C., the oily liquid thickened and became quite viscous. The viscous siloxane when applied to a flat sheet with 1% benzoyl peroxide therein as a polymerizing catalyst formed a tack-free film on being heated to 100° C. for three hours. The ratio of hydrocarbon radicals per silicon atom was 1.9 to 1 in this example.

*Example 6*

A mixture of 20 grams (0.1 mole) of diallylsilicon diethoxide, 70 cc. of dimethylsilicon diethoxide, 50 cc. of 95% ethanol, and 50 cc. of concentrated hydrochloric acid was refluxed for three hours. An oily liquid resulted. The oily liquid was washed with water and dried over calcium chloride. When applied to a flat surface and heated overnight at 110° C., a hard transparent film was produced without the use of a polymerizing catalyst. The film did not swell in toluene or other hydrocarbon liquids. The ratio of hydrocarbon groups per silicon atom was 2 to 1.

The most flexible interpolymers are produced when the saturated organic silicon oxide is one having a preponderance of molecules with two saturated organic groups per silicon atom. The proportion of molecules with a single organic group per silicon atom must be controlled in view of the degree of flexibility desired.

One of the outstanding properties, from a practical viewpoint, of the interpolymers of an allyl siloxane and a saturated organic siloxane is the greatly improved drying time. For example, a methyl siloxane may require heating as much as 50 or 100 hours at 200° C. and as much as 12 hours at 250° C. to produce a dry film of the polymer. By comparison, the interpolymers of saturated organic siloxane with as little as 1% of the allyl siloxane can be dried in about 3 hours at 200° C. and less than this at 250° C. Obviously, this improvement in drying times and temperatures enables the economical application of the polymers in preparing various types of apparatus. Not only is the processing more rapid but the life of the resulting resinous polymer is not affected by the disproportionate drying times previously required with saturated organosilicon oxides.

In preparing various copolymers, good results have been obtained where the mole proportion of allyl radical in the copolymer with the saturated alkyl silicon compounds has ranged from less than 10% to 50% or more. A small proportion of allylsilicon compound may be copolymerized with saturated alkylsilicon compounds, such as methylsilicon compounds, to expedite faster setting at lower temperatures. For example, 16 mole per cent of allylsilicon compound in a copolymer with a methylsilicon compound will lower the setting temperature from 200° C. to 120° C. for a given heating period. The benefits of a lower setting temperature are particularly desirable since it has been found that higher setting temperatures frequently result in the oxidation of the base member to which the siloxane resin is being applied with the resultant weakening of the bond between the resin and the member.

A still further advantage which is secured by copolymerizing allylsilicon compounds with saturated alkyl siloxanes is the improvement in physical properties at high temperatures. A body consisting of a dimethyl siloxane resin is barely able to support its own weight at 200° C. A hydrolyzed and condensed copolymer of 33% allylsilicon triethoxide and 67% dimethylsilicon dioxide has been found to be structurally strong at 200° C., whereby it can support a considerable load without failure.

In interpolymers containing allylsilicon compounds, in addition to the silicon-oxygen bonds, cross-linking appears to take place through the unsaturated allyl groups and the molecules appear to be united with strong primary valence forces. For this reason the solvent resistance and other mechanical properties are greatly increased, and a much more usable resinous material is secured.

In preparing the interpolymers of saturated organic silicon and allylsilicon compounds, it has been found that a desirable process to follow is to hydrolyze a mixture in predetermined proportions of the respective saturated organic silicon ester, and the allylsilicon ester. The hydrolysis product is then dehydrated and partially polymerized, for example, by heating for a short period of time until a relatively viscous liquid or gum-like mass is produced, but the polymerization should not be carried out to that extent that the mass is rendered insoluble in a hydrocarbon solvent such as toluene. Toluene or other hydrocarbon solvent is then applied to the partially polymerized mass to produce a liquid varnish suitable for application to members.

The low siloxane polymers, either the allyl siloxane or interpolymers thereof, need not be dissolved in a solvent, but may be dispersed or emulsified in a volatile liquid carried such as water. The water may be rendered alkaline with ammonia, for example, and a dispersing agent added, such for instance as, diglycol stearate or a sodium alkyl sulfonate ester. Hydrolyzed polyvinyl esters and an alcohol, such as ethyl alcohol, may be present in the water to facilitate dispersion of the siloxane and to render the dispersion stable. The fluid siloxane polymer admixed with the water and the conditioning agents can be passed through a suitable dispersing device such as a gear pump or colloid mill to break up the siloxane into finely divided particles and to establish a stable dispersion. Such varnish or dispersion will be relatively fluid and capable of readily penetrating the pores and interstices of various base members. After applying to a suitable base material, preferably an inorganic substance, the varnish is subjected to drying to remove the solvent or other liquid carrier. The viscous or gum-like siloxane interpolymer will be retained by the pores or interstices of the materials whereby it will not exude or escape during further processing. When the base material is more or less completely processed, as by cutting, shaping, bending, compacting or stretching, and the like, the siloxane interpolymer impregnant may be completely polymerized to a state which is hard and resistant to solvents, while maintaining a predetermined flexibility.

In some cases, interpolymers may be prepared by dehydrating and partially polymerizing saturated alkyl or aryl silicols to low polymer siloxanes which are quite fluid and mixing with allyl siloxanes dehydrated and partially polymerized to about the same extent. By advancing the degree of polymerization of the siloxanes in the mixture, interpolymerization is accomplished. If the partial polymers are rather viscous they can be dissolved in a hydrocarbon solvent and mixed more readily in solution and interpolymerization effected to form a combination.

Referring to Fig. 1 of the drawing, there is illustrated a laminated member 10 produced according to the process disclosed herein. Each of the plurality of laminations 12 of the body 10 may be of any suitable inorganic material, such as glass fibers in the form of cloth, felt, tape, or the like, or an asbestos cloth or felt or asbestos paper, or other inorganic body. For best strength, continuous filament glass fibers in fabric form are desirable. The laminations 12 are preferably impregnated with a varnish solution of a low allyl silicon oxide polymer or a partially interpolymerized allylsilicon compound and an aryl or saturated alkylsilicon compound. The laminations upon drying to remove the solvent are then cut to shape and stacked. The stacked laminations are then molded under pressure to predetermined form at suitable temperatures of from 70° C. to 200° C. or more, depending on the desired rapidity of polymerization. A solid, well bonded body is obtained by the process.

A particularly advantageous application for the interpolymers of the present invention is their use as electrical insulation where their ability to withstand high temperatures for prolonged periods of time as compared to all-hydrocarbon insulating materials is valuable.

Referring to Fig. 2 of the drawing, there is illustrated an insulated conductor 20 comprising a metallic conductor 22 and an insulating coating 24 of a polymerized allyl siloxane applied thereto. The polymers and interpolymers of an allyl silicon compound and an aryl or saturated alkylsilicon compound polymerized to the state that they are relatively viscous while soluble in a suitable hydrocarbon solvent may be applied to the conductor 22 in solution similar to a conventional wire enamel. The conductor may be immersed in a solution or dispersion of the siloxanes and subjected to heat to first remove the hydrocarbon solvent and then to polymerize the resin. A polymerizing catalyst may be added in order to expedite the drying operation.

Referring to Fig. 3 of the drawing, there is shown an insulated conductor 26 comprising a metal conductor 22 carrying insulation 28. The insulation 28 comprises one or more layers of an inorganic fibrous material, such as asbestos fibers, cloth, or the like, or glass fibers in the form of sliver, continuous filaments, yarn, tape or the like. Thereafter the interstices of the fibrous material are impregnated with a varnish of allyl siloxane or siloxane interpolymer or copolymer containing allyl groups attached to silicon.

Fig. 4 of the drawing illustrates the application of the allyl siloxane polymers and interpolymers to a dynamo-electric machine. The stator 30 of a motor or generator, for example, comprising a plurality of laminations of magnetic material, contains a plurality of slots 32 machined in the laminations. The slots 32 are so machined that a narrow entering groove 34 is provided at the top to permit the introduction of conductors and the like and to facilitate retaining such conductors in the slots 32. Slot cell liners 36 prepared from an inorganic material, such, for example, as glass fiber cloth coated with an allyl siloxane interpolymer, are placed within the slots 32. Coils 38 and 40 are wound within the slot cell 32 lined with the insulating liner 36 according to the conventional practice. The conductors of the coils 38 and 40 are insulated with the allyl siloxane or interpolymer described herein. The phase insulating separator 42 and the liner strip 44 may be made in a manner similar to the slot cell liner 36 and applied to insulate the coils 38 and 40 from the rest of the apparatus. A wedge 46, which may be prepared from suitable inorganic materials, or, in some cases, from glass fiber cloth impregnated with the polymeric resins of this invention and polymerized to shape under pressure, is driven into the top of the slot to retain the coils in their predetermined position.

In some cases conductors may be insulated by coating with the partially polymerized interpolymer without requiring the preparation of a varnish by extruding the viscous partial polymer about the conductor by means of a die.

In preparing polymeric bodies from the allylsilicon ethoxides as well as the allyl siloxanes and interpolymers of allyl siloxanes, it may be desirable in many instances to embody therein finely divided inorganic materials, such, for example, as silica flour, bentonite, glass powders, calcium fluoride, ceramic powders and the like. A paste or thick liquid may be prepared from the silicon compound by incorporating a suitable amount of pulverized inorganic powder—for example, up to 50% by weight of the whole. The paste may be applied as a filler to electrical coils and other electrical apparatus. Upon heat treatment with or without a polymerizing catalyst, a hard, dense, solvent-resistant polymeric mass will be obtained.

The siloxane interpolymer embodying a proportion of allylsilicon compound may be applied to mica flakes in solution in a solvent and thereafter drying out sheets or bodies built up therefrom to remove the solvent, molding to shape and completing polymerization of the silicone into a hard, solvent-resistant state. Referring to Fig. 5 of the drawing, there is illustrated a sheet 50 composed of mica flakes bonded by means of copolymers or interpolymers having allyl groups attached to silicon atoms. The mica sheet may be prepared with a backing of an inorganic fibrous material such, for example, as glass fibers or asbestos in fabric form.

The several polymerizable allylsilicon compounds described herein may be combined with finely divided graphite, anthracite coal or coke, either coal coke or petroleum coke heat treated at 500° C. to 700° C. to produce semiconducting paints and varnishes. Such paints and varnishes are particularly useful for application to generators and other high voltage apparatus operating above 6900 volts to reduce or eliminate the generation of corona thereon. Both the anthracite coal and coke are stable at temperatures of 200° C. to 300° C. or even higher.

Since certain changes in carrying out the above processes and certain modifications in the apparatus and applications embodying the materials produced by the processes of the invention may be made without departing from its scope, it is intended that all the matter contained in the above description or shown in the accompanying drawings shall be interpreted as illustrative and not in a limiting sense.

We claim as our invention:

1. A composition of matter comprising a heat-treated monovalent hydrocarbon - substituted polysiloxane wherein the hydrocarbon radicals consist of allyl radicals and methyl radicals linked directly to the polysiloxane silicon atoms by carbon to silicon linkages and wherein no polysiloxane silicon atom is linked directly to both allyl and methyl radicals by such linkages, the allyl radicals comprising from 12.5 to 20% of the total number of silicon-bonded hydrocarbon radicals, the said polysiloxane containing an average of from 1.33 to 1.8 silicon-bonded hydrocarbon radicals per silicon atom, the heat-treated polysiloxane being characterized by both siloxane linkages and cross-linkages through reaction between the allyl groups.

2. A polymerized composition of matter comprising a heat-treated interpolymer consisting of an allyl siloxane having from one to two allyl groups per silicon atom interpolymerized with a hydrocarbon siloxane having the formula

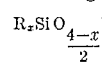

where R represents at least one hydrocarbon radical selected from the group consisting of phenyl, methyl and ethyl radicals and $x$ represents a number from 1 to 2, the allyl radicals and the hydrocarbon radicals in the said hydrocarbon siloxane being attached directly to silicon atoms by carbon to silicon linkages, the said interpolymer containing a total of from 1.33 to 1.9 silicon-bonded hydrocarbon radicals per silicon atom, the allyl siloxane being present in an amount equal to at least 0.1% of the weight of the interpolymer, and the total number of allyl radicals does not exceed 20% of the total number of hydrocarbon radicals in the interpolymer, the heat-treated interpolymer being characterized by both siloxane linkages and cross-linkages through reaction between the allyl groups.

3. The polymerizable monovalent hydrocarbon substituted polysiloxane containing an average of from 1.33 to 1.9 hydrocarbon groups per silicon atom wherein the hydrocarbon groups consist of allyl and phenyl radicals and are attached directly to the polysiloxane silicon atoms by C—Si bonds and any silicon atom having allyl groups directly attached thereto has no other hydrocarbon group attached directly thereto and wherein the allyl groups comprise from 5 to 20 per cent of the total number of silicon-bonded hydrocarbon radicals.

4. A composition of matter comprising a polymerizable monovalent hydrocarbon substituted polysiloxane wherein the hydrocarbon radicals consist of (a) allyl radicals and (b) monovalent radicals selected from at least one of the class consisting of methyl and phenyl radicals, all the aforementioned hydrocarbon radicals being present in the ratio of from 1.33 to 1.9 hydrocarbon radicals per silicon atom and are directly attached to the polysiloxane silicon atoms by C—Si bonds, and any silicon atom having allyl groups directly attached thereto has no other hydrocarbon group attached directly thereto, the said allyl radicals comprising from 1/10 to 1/5 of the total number of silicon-bonded hydrocarbon radicals.

JACK SWISS.
CLYDE E. ARNTZEN.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,276,094 | Rothrock | Mar. 10, 1942 |
| 2,320,536 | Pollack | June 1, 1943 |
| 2,377,689 | Hyde | June 5, 1945 |
| 2,386,793 | Hanford | Oct. 16, 1945 |
| 2,388,161 | Kropa | Oct. 30, 1945 |
| 2,397,727 | Daudt | Apr. 2, 1946 |
| 2,409,633 | Kropa | Oct. 22, 1946 |
| 2,436,304 | Johannson | Feb. 17, 1948 |
| 2,486,162 | Hyde | Oct. 25, 1949 |

OTHER REFERENCES

Hurd, Journal American Chemical Soc. vol. 67, Oct. 1945, pp. 1813 and 1814.

Andrianov, J. Gen. Chem. (U. S. S. R.) vol. 8, No. 10, pp. 969–971 (1938).